(12) United States Patent
Kondou

(10) Patent No.: US 10,889,070 B2
(45) Date of Patent: Jan. 12, 2021

(54) COMPOSITE MATERIAL INCLUDING UNIDIRECTIONAL CONTINUOUS FIBERS AND THERMOPLASTIC RESIN

(71) Applicant: Teijin Limited, Osaka (JP)

(72) Inventor: Yutaka Kondou, Osaka (JP)

(73) Assignee: Teijin Limited, Osaka (JP)

( * ) Notice: Subject to any disclaimer, the term of this patent is extended or adjusted under 35 U.S.C. 154(b) by 447 days.

(21) Appl. No.: 15/346,279

(22) Filed: Nov. 8, 2016

(65) Prior Publication Data

US 2017/0050390 A1    Feb. 23, 2017

Related U.S. Application Data

(62) Division of application No. 14/839,191, filed on Aug. 28, 2015, now abandoned.

(30) Foreign Application Priority Data

Aug. 28, 2014   (WO) .................. PCT/JP2014/072530

(51) Int. Cl.
   *B29C 70/20* (2006.01)
   *B29C 70/46* (2006.01)
   (Continued)

(52) U.S. Cl.
   CPC .............. *B29C 70/20* (2013.01); *B29B 13/02* (2013.01); *B29C 43/28* (2013.01); *B29C 70/46* (2013.01);
   (Continued)

(58) Field of Classification Search
   CPC ... B29C 70/523; B29C 70/527; B29C 70/506; B29C 70/50; B29C 70/20; B29C 70/16
   See application file for complete search history.

(56) References Cited

U.S. PATENT DOCUMENTS 4,044,188 A * 8/1977 Segal .................... B29C 70/025
                                                              428/297.4
4,992,229 A * 2/1991 Beever .................... B29C 53/16
                                                              156/199
(Continued)

FOREIGN PATENT DOCUMENTS

JP        H08-108483 A    4/1996
JP        H10-305490 A    11/1998
(Continued)

OTHER PUBLICATIONS

Dec. 2, 2015—(JP) Office Action—App 2014-542608.
(Continued)

*Primary Examiner* — Matthew J Daniels
(74) *Attorney, Agent, or Firm* — Banner & Witcoff, Ltd.

(57) ABSTRACT

According to one example of the present invention, there is provided a composite material for cold pressing including: carbon fibers that are unidirectional continuous fibers; and a thermoplastic resin, wherein the composite material has a thickness of 0.3 mm or more, when the composite material is observed from a direction perpendicular to a continuous fiber direction, a cross section of the carbon fibers included in the composite material satisfies the following specific Expressions (1), (2) and (3):

$n1/N \leq 0.1$    Expression (1), $p < 0.01$    Expression (2), and $0.001 \leq (1 - dc/(dr^*(Vr/100) + df^*(Vf/100))) \leq 0.1$    Expression (3).

17 Claims, 4 Drawing Sheets

(51) Int. Cl.
  B29C 43/28 (2006.01)
  B32B 5/12 (2006.01)
  B32B 27/12 (2006.01)
  B29B 13/02 (2006.01)
  B29K 101/12 (2006.01)
  B29K 307/04 (2006.01)
  B29L 9/00 (2006.01)

(52) U.S. Cl.
  CPC .............. B29C 70/465 (2013.01); B32B 5/12 (2013.01); B32B 27/12 (2013.01); *B29K 2101/12* (2013.01); *B29K 2307/04* (2013.01); *B29L 2009/00* (2013.01); *B32B 2260/023* (2013.01); *B32B 2260/046* (2013.01); *B32B 2262/106* (2013.01); *B32B 2274/00* (2013.01); *B32B 2307/558* (2013.01); *B32B 2457/00* (2013.01); *B32B 2605/003* (2013.01); *B32B 2605/08* (2013.01); *B32B 2605/12* (2013.01); *B32B 2605/18* (2013.01)

(56) References Cited

U.S. PATENT DOCUMENTS

| | | | |
|---|---|---|---|
| 5,093,155 | A | 3/1992 | Miyazaki et al. |
| 5,513,537 | A * | 5/1996 | Brooks ................. G01N 19/04 73/865.8 |
| 2010/0215887 | A1 | 8/2010 | Kawabe |
| 2012/0270009 | A1 | 10/2012 | Kawabe |
| 2012/0270030 | A1 | 10/2012 | Kawabe |
| 2013/0136890 | A1* | 5/2013 | Maliszewski ......... B29C 47/004 428/113 |
| 2013/0149491 | A1 | 6/2013 | Wakeman et al. |
| 2015/0101756 | A1 | 4/2015 | Lawrence et al. |
| 2015/0101759 | A1 | 4/2015 | Lee et al. |

FOREIGN PATENT DOCUMENTS

| | | |
|---|---|---|
| JP | 2003-165851 A | 6/2003 |
| JP | 2004-223743 A | 8/2004 |
| JP | 2012-149170 A | 8/2012 |
| JP | 2012-254632 A | 12/2012 |
| JP | 2013-010255 A | 1/2013 |
| JP | 2013-104056 A | 5/2013 |
| JP | 2013-176876 A | 9/2013 |
| JP | 2014-105245 A | 6/2014 |
| JP | 2014-105310 A | 6/2014 |
| WO | 2011156693 A2 | 12/2011 |
| WO | 2013174183 A1 | 11/2013 |
| WO | 2013175183 A2 | 11/2013 |

OTHER PUBLICATIONS

Dec. 2, 2014—(WO) Written Opinion with Translation—App PCT/JP2014/072530.
Jan. 27, 2016—(EP) Extended Search Report—App 15182991.
Campbell, F.C. ED—Campbell Flake C: "Manufacturing processes for advanced composites, Chapter 10 (Thermoplastic Composites: An Unfulfilled Promise)", Jan. 1, 2004, Manufacturing Processes for Advanced Composites, Elsevier Advanced Technology, pp. 1-41.
Jun. 29, 2017—(EP) Third Party Observations—App 15182991.8.
Kawabe, Kazumasa, Matsuo, Tatsuki, and Maekawa, Zen-ichiro, "The Impregnation Behavior of Matrix Resin into the Opened Reinforcing Fiber Tows," (J. Soc. Mat. Sci., Japan), vol. 47, No. 7, pp. 735-742, Jul. 1998—Eng Tran.
JSME Mechanical Engineering Dictionary, pp. 18-19—Eng. Tran.
Comprehensive Dictionary of Chemistry, p. 594—Eng Tran.

* cited by examiner

COMPOSITE MATERIAL INCLUDING UNIDIRECTIONAL CONTINUOUS FIBERS AND THERMOPLASTIC RESIN

CROSS-REFERENCE TO RELATED APPLICATIONS

This application is a division of U.S. application Ser. No. 14/839,191, filed Aug. 28, 2015, which is based on and claims priority under 35 U.S.C. 119 from International Patent Application No. PCT/JP2014/072530 filed on Aug. 28, 2014, the entire disclosures of which are incorporated by reference.

TECHNICAL FIELD

The present invention relates to a composite material including unidirectional continuous fibers and a thermoplastic resin. More specifically, the present invention relates to a composite material having good impregnation property of matrix resin and is suitably applicable to structural components represented by automobiles.

BACKGROUND ART

Recently, a carbon fiber reinforced resin including a matrix resin and carbon fibers has attracted attention in the mechanical field. The characteristics of the carbon fiber reinforced resin are light in weight and excellent in strength.

Various fiber reinforced resins having excellent strength have been known. As one element for securing mechanical strength, adhesion between carbon fibers and a resin can be considered. Generally, a carbon fiber reinforced resin is often produced by impregnating a matrix resin into fibers. Accordingly, as impregnation property of the matrix resin to the carbon fibers are improved, a carbon fiber reinforced resin having excellent strength is more likely to be obtained.

In addition, there are various methods for obtaining a shaped product obtained by molding a fiber reinforced resin. Examples of a general method include autoclave, resin transfer molding (RTM), hot pressing and cold pressing. Among them, when a composite material including a thermoplastic resin that is reinforced with carbon fibers is used, hot pressing and cold pressing can be used and from the viewpoint of productivity, a shaped product is often produced by cold pressing in which molding can be carried out at a high cycle.

Examples of the composite material including carbon fibers and a thermoplastic resin include materials obtained by layering a required number of sheets to mold the layered body into a predetermined shape using a thermoplastic resin prepreg sheet material that is obtained by impregnating a thermoplastic resin into a fiber bundle. For example, a method as described in JP-A-2012-254632, the method including layering plural prepreg sheets prepared by attaching a film-like resin softened at the melting point or lower on reinforcing fibers parallel arranged, and heating and pressurizing the layered body, an auto lay-up method as described in JP-A-2013-104056, the auto lay-up method including preparing a tape obtained by dipping a fiber bundle into a molten resin so as to almost completely impregnate the resin into the fiber bundle, attaching the tape while melting, and layering the tape, and the like can be used to obtain a shaped product.

In addition, JP-A-2014-105310 discloses production conditions to obtain a high quality prepreg by a double belt method and a unidirectional composite material in which voids and a thermoplastic resin are uniformly dispersed. JP-A-2014-105245 discloses production conditions to prevent fine voids derived from a prepreg from being formed at the time of molding a thermoplastic prepreg.

JP-A-2003-165851 discloses a unidirectional reinforcing fiber sheet in a semi-impregnated state to prepare a flexible fiber reinforced thermoplastic resin sheet. JP-A-2004-223743 discloses a tape-like product of unidirectional continuous fibers provided with voids for the purpose of improving impact absorption.

In addition, JP-A-2012-149170 discloses a material produced by hot-pressing a unidirectionally oriented carbon fiber composite material sheet.

However, molding by heating and pressurizing, and thickening by layering disclosed in JP-A-2012-254632 and JP-A-2013-104056 are seen as an extension of a technique used for a carbon fiber reinforced thermosetting resin material using a thermosetting resin. When any of these is applied to industrial applications, molding by cold pressing is not preferable because a tact time tends to become longer. In addition, when the prepregs obtained by the methods disclosed in JP-A-2014-105310 and JP-A-2014-105245 are cold-pressed, the thermal stability of the composite material is not sufficient or not stable. Further, since the reinforcing fiber sheet described in JP-A-2003-165851 is in a semi-impregnated state, the mechanical properties are low when a shaped product is formed. In addition, since the reinforcing fiber sheet is designed for hot pressing, cold pressing cannot be applied thereto. Further, since the material disclosed in JP-A-2004-223743 is designed for leaving voids after molding by reducing the pressure when the material is hot-pressed, means for solving inherent problems arising at the time of cold pressing is not suggested. Even the case of a shaped plate that is obtained from the unidirectionally oriented carbon fiber composite material sheet disclosed in JP-A-2012-149170, the plate is produced by hot pressing, and thus inherent problems arising at the time of cold pressing cannot be solved as in the above description.

The present invention has been made in consideration of the above-described problems arising in cold pressing using a conventional composite material, and an object thereof is to provide a composite material having excellent moldability at the time of cold pressing.

SUMMARY

That is, the present invention is as follows.

[1] A composite material for cold pressing including:
carbon fibers that are unidirectional continuous fibers; and
a thermoplastic resin,
wherein the composite material has a thickness of 0.3 mm or more,
when the composite material is observed from a direction perpendicular to a continuous fiber direction, a cross section of the carbon fibers included in the composite material satisfies Expression (1), (2) and (3):

$$n1/N \leq 0.1 \qquad \text{Expression (1),}$$

$$p < 0.01 \qquad \text{Expression (2),}$$

and $$0.001 \leq (1 - dc/(dr^*(Vr/100) + df^*(Vf/100))) \leq 0.1 \qquad \text{Expression (3),}$$

wherein N represents the number of carbon fibers included in the composite material, n1 represents the number of carbon fibers in which less than 50% of the surface is covered with at least one of the thermoplastic resin and a sizing agent, p represents a ratio of the number of carbon fibers which are not substantially covered with any of the thermoplastic resin and the sizing agent, Vr represents a volume ratio (%) of thermoplastic resin included in the composite material, Vf represents a volume ratio (%) of carbon fibers included in the composite material, dr represents a density of thermoplastic resin, df represents a density of carbon fibers, and dc represents a density of the composite material.

[2] The composite material according to [1], wherein a volume ratio (Vf) of the carbon fibers included in the composite material is 10 Vol % or more and 70 Vol % or less.

[3] The composite material according to [1] or [2], wherein the thickness of the composite material is 0.4 mm or more and 10.0 mm or less.

[4] The composite material according to any one of [1] to [3], wherein a width of the composite material is 20 mm or more and 2,000 mm or less.

[5] A layered body including: the composite material according to any one of [1] to [4]; and an isotropic base material in which discontinuous carbon fibers are randomly dispersed.

[6] A method of producing a shaped product including: cold-pressing the composite material according to any one of [1] to [4], wherein a density dm of the shaped product satisfies $$(1-dm/(dr*(Vr/100)+df*(Vf/100)))<(1-dc/(dr*(Vr/100)+df*(Vf/100)))\times 0.8.$$

[7] The method of producing a shaped product according to [6], wherein the density dm of the shaped product satisfies Expression (4):

$$0 \le (1-dm/(dr*(Vr/100)+df*(Vf/100))) \le 0.08 \quad \text{Expression (4)}.$$

[8] A method of producing the composite material according to any one of [1] to [4], the method including:

heating a composite material precursor;

adjusting a cross-sectional area of the composite material precursor including carbon fibers which are unidirectional continuous fibers and a thermoplastic resin with a jig; and cooling the composite material precursor to produce a composite material.

[9] The method of producing a composite material according to [8], wherein the jig is a hollow jig, and a minimum cross-sectional area St of a hollow portion of the hollow jig satisfies Expression (5):

$$(Sf+Sr)<St<(Sf+Sr)*1.3 \quad \text{Expression (5)}$$

wherein Sf represents an area of carbon fibers included in the composite material when observed from the cross-sectional direction perpendicular to the continuous fiber direction, and Sr represents an area of thermoplastic resin included in the composite material when observed from the cross-sectional direction perpendicular to the continuous fiber direction.

The thermal conductivity of the composite material of the present invention is deteriorated by adjusting the density of the composite material and providing voids, and the stability of the thermoplastic resin included in the composite material in a molten state and the thermal stability of the composite material at the time of cold pressing are improved. Therefore, the appearance of a shaped product after cold pressing is improved.

Further, when the composite material is formed into a shaped product, the number of carbon fibers that are not coated with the thermoplastic resin is small and voids are not present in the shaped product. Thus, a shaped product which is stable and has good mechanical properties while having a good appearance can be obtained.

DETAILED DESCRIPTION

Figure 1:
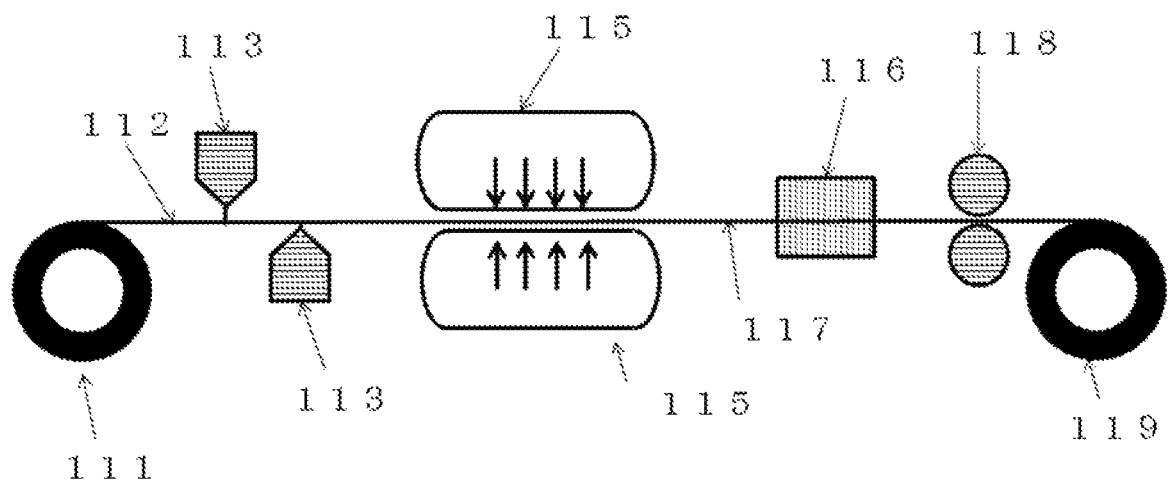
FIG. 1 shows a schematic view of an example of a method of producing a composite material.

A composite material of one example in the present invention is a composite material for cold pressing, including carbon fibers that are unidirectional continuous fibers and a thermoplastic resin, and having a thickness of 0.3 mm or more. When the composite material is observed from a direction perpendicular to the continuous fiber direction, a cross section of the carbon fibers included in the composite material satisfies the following Expressions (1), (2) and (3).

$$n1/N \le 0.1 \quad \text{Expression (1)};$$

$$p < 0.01 \quad \text{Expression (2)};$$

and $$0.001 \le (1-dc/(dr*(Vr/100)+df*(Vf/100))) \le 0.1 \quad \text{Expression (3)},$$

wherein N represents the number of carbon fibers included in the composite material, n1 represents the number of carbon fibers in which less than 50% of the surface is covered with at least one of the thermoplastic resin and a sizing agent, p represents a ratio of the number of carbon fibers which are not substantially covered with any of the thermoplastic resin and the sizing agent, Vr represents a volume ratio (%) of thermoplastic resin included in the composite material, Vf represents a volume ratio (%) of carbon fibers included in the composite material, dr represents a density of thermoplastic resin, df represents a density of carbon fibers, and dc represents a density of the composite material.

Here, unless otherwise particularly specified, the volume ratio and density in the same expression of the specification are shown based on the same units.

[Coverage of Continuous Fibers]

When the number of carbon fibers in which less than 50% of the surface is covered with at least one of the thermoplastic resin and sizing agent is more than 0.1 with respect to the number of continuous fiber included in the composite material, a large number of carbon fibers which are not covered with any of the thermoplastic resin and sizing agent remain in a shaped product obtained by cold pressing, and thus the mechanical properties of the obtained shaped product are deteriorated to have poor appearance after molding. The value of n1/N is preferably less than 0.08, more preferably less than 0.05, and still more preferably less than 0.02.

When the ratio (p) of the number of carbon fibers which are not substantially covered with any of the thermoplastic resin and sizing agent is 0.01 or more, deterioration in the mechanical properties of the shaped product after molding, particularly, compressive strength, is caused. The value of p is preferably less than 0.007 and more preferably less than 0.005. Here, the ratio (p) of the number of carbon fibers which are not substantially covered with any of the thermoplastic resin and sizing agent refers to a ratio of the number of carbon fibers in which about less than 10% of the surface is covered with at least one of the thermoplastic resin and sizing agent. The method of measuring p is as follows.

[Regarding Expression (3)]

The value of $(1-dc/(dr*(Vr/100)+df*(Vf/100)))$ defined by Expression (3) indicates a so-called filling rate of the composite material and a difference obtained by subtracting the value from 1 refers to a ratio of voids included in the composite material (hereinafter, $(1-dc/(dr*(Vr/100)+df*(Vf/100)))$ is referred to as a second side of Expression (3) in some cases).

In the case in which the value defined by the second side of Expression (3) is less than 0.001, when the composite material is heated at the time of cold pressing and transferred to a mold, the stability of the thermoplastic resin included in the composite material in a molten state is deteriorated (the thermal stability of the composite material is deteriorated), and the time for holding the thermoplastic resin in a molten state is shortened. Thus, the shaped product has poor appearance after cold pressing or poor adhesion to other materials.

On the other hand, in the case in which the value defined by the second side of Expression (3) is more than 0.1, the stability of the thermoplastic resin included in the composite material in a molten state or the thermal stability of the composite material at the time of cold pressing is good. However, there is a concern that the time for heating the thermoplastic resin until the thermoplastic resin is melted can be increased or voids after cold pressing may not disappear. Thus, the impact resistance of the shaped product or the like is locally deteriorated.

That is, the inventor has found that the thermal conductivity of the composite material is deteriorated by adjusting the value defined by the second side of Expression (3) to a fixed range to improve the stability of the thermoplastic resin constituting the composite material in a molten state at the time of cold pressing.

Regarding this point, in JP-A-2013-49751, a technique for a composite material including discontinuous carbon fibers is disclosed and in the paragraph 0015, an effect that the material can be shaped into a complex shape by adjusting porosity is disclosed. However, the carbon fibers included in the composite material in the present invention are continuous fibers and the technical idea thereof is different from JP-A-2013-49751.

When a composite material including discontinuous carbon fibers is heated to a temperature of a softening point (melting point or glass transition temperature) of a resin or higher, for cold pressing, since fixation of carbon fibers by the resin in solid is relieved and the carbon fibers have high rigidity, the composite material swells to form voids in the composite material (this phenomenon is called "spring back", that is, a phenomenon that, in an aggregate in which compressed and fixed discontinuous carbon fibers are in a crossing state, the state of fibers returns to the state before compression when the fixing is relieved or weakened).

Originally, the phenomenon that the composite material swells by spring back is likely to be considered as a defect. However, voids formed by spring back contribute to improving the thermal stability of the composite material at the time of cold pressing. Thus, from this viewpoint, when an attention has to be paid to the expansion of the composite material by spring back, the expansion is not always a defect.

On the other hand, when the carbon fibers are continuous fibers, the carbon fibers are not in a complicated crossing state. Thus, even when the composite material is heated, spring back hardly occurs. When the composite material is heated before cold pressing, the composite material hardly swells.

That is, when the carbon fibers are continuous fibers, the thermal stability is poor compared to the composite material including discontinuous carbon fibers and the problems in the present invention do not arise in the technique disclosed in JP-A-2013-49751.

The value of the second side of Expression (3) may be calculated in the same manner as described above even when a third component other than the thermoplastic resin and carbon fibers is present in the composite material. Since the carbon fibers and thermoplastic resin capable of controlling voids before and after cold pressing contribute to control the thermal stability of the composite material, there is no need to consider the third component other than these components.

The lower limit defined by the second side of Expression (3) is preferably 0.003 and more preferably 0.005. The upper limit is preferably 0.07, more preferably 0.05, still more preferably 0.03, and even still more preferably 0.02.

When the composite material of the present invention satisfies Expressions (1) and (2) and satisfies Expression (3) while covering the carbon fibers with the thermoplastic resin or sizing agent without simply reducing the number of voids included in the composite material, a shaped product which is stable and has good mechanical properties while having a good appearance can be prepared.

(Conventional Design)

Regarding the voids, JP-A-2013-202813 and FIG. 1 of JP-A-8-108483 disclose techniques capable of reducing the number of "voids between fibers" and "voids formed at the interface between the fiber and the thermoplastic resin". However, the reason why voids are formed even when conventionally unidirectional prepregs are layered and hot-pressed is that insufficient impregnation of fibers with the resin and this can be considered to cause voids after hot pressing.

That is, when a unidirectionally oriented carbon fiber reinforced composite material is produced by a conventional pultrusion method, voids have been considered as a cause for defects and thus the material has been designed to reduce the number of voids. In the conventional techniques, the "insufficient impregnation of the carbon fibers with the resin" and "voids" are not distinguished from each other and the both are considered as causes for defects.

In contrast, the inventor separately considers that the cross section of carbon fibers satisfies Expressions (1) and (2) from that the density dc of the composite material satisfies Expression (3).

The inventor has made the thermal conductivity of the composite material be lowered by adjusting the density dc of the composite material so as to satisfy Expression (3) and providing voids to improve the stability of the thermoplastic resin included in the composite material in a molten state and the thermal stability of the composite material at the time of cold pressing.
(Others)

JP-A-2008-308543 and JP-A-07-156172 disclose techniques of reducing the thermal conductivity by providing voids in a shaped product using a heat insulator or the like and in any of these techniques, a composite material before cold pressing is not mentioned and there is only a description of voids in the shaped product. The idea thereof is totally different from that of the present invention.
[Cold Pressing]

The method which includes steps A-1) to A-2) to conduct molding is a so-called cold pressing method.
- A-1) Step in which the composite material is heated to a temperature of the melting point of a thermoplastic resin or more and the decomposition temperature thereof or less when the resin is crystalline, or a temperature of the glass transition temperature of the resin or more and the decomposition temperature thereof or less when the resin is amorphous.
- A-2) Step in which the heated composite material obtained in A-1) is arranged in a mold adjusted at a temperature of the melting point of the resin or less when the resin is crystalline or a temperature of the glass transition temperature of the resin or less when the resin is amorphous, and the heated composite material is pressed to complete the molding.

[Carbon Fiber]

Carbon fibers can be used to obtain a fiber reinforced composite material of one example in the present invention which is light in weight and excellent in strength. As carbon fibers, generally, polyacrylonitrile (PAN)-based carbon fibers, petroleum or coal pitch-based carbon fibers, rayon-based carbon fibers, cellulose-based carbon fibers, lignin-based carbon fibers, phenol-based carbon fibers, vapor phase epitaxy-based carbon fibers, and the like are known. However, any carbon fiber of these in the present invention can be suitably used.

Among these, in the present invention, from the viewpoint of excellent tensile modulus, the use of polyacrylonitrile (PAN)-based carbon fibers is preferable. When PAN-based carbon fibers are used as carbon fibers, the tensile modulus thereof is preferably within a range of 100 GPa to 600 GPa, more preferably within a range of 200 GPa to 500 GPa, and still more preferably within a range of 230 GPa to 450 GPa. In addition, the tensile strength is preferably within a range of 2,000 MPa to 10,000 MPa and more preferably within a range of 3,000 MPa to 8,000 MPa.

The fiber diameter of the carbon fibers used in one example of the present invention may be appropriately determined according to the type of carbon fibers and is not particularly limited. For example, typically, the average fiber diameter is preferably within a range of 3 μm to 50 μm, more preferably within a range of 4 μm to 12 μm, and still more preferably within a range of 5 μm to 8 μm. Here, the above average fiber diameter refers to a diameter of a single yarn carbon fiber. Accordingly, when carbon fibers are in a fiber bundle form, the above average fiber diameter does not refer to the diameter of the fiber bundle but refers to the diameter of each carbon fiber (single yarn) constituting the fiber bundle. For example, the average fiber diameter of carbon fibers can be measured according to the method descried in JIS R 7607 (2000).

The carbon fiber used in one example of the present invention may be constituted by only a single yarn or only a fiber bundle and these may be in combination. The fiber bundle used herein refers that 2 or more single yarns come close to each other by a sizing agent, electrostatic force, or the like. When the fiber bundle is used, the number of single yarns constituting each fiber bundle may be almost the same or may be different in each fiber bundle.

When the carbon fibers used in the present invention are in a fiber bundle form, the number of single yarns constituting each fiber bundle is not particularly limited and is typically within a range of 1,000 to 100,000 yarns.
(Weight of Carbon Fibers)

The fiber areal weight of the carbon fibers in the composite material is not particularly limited and is typically 25 g/m² to 10,000 g/m².
[Volume Ratio (Vf) of Carbon Fibers]

In the present invention, the volume ratio of the carbon fibers included in the composite material, defined by the following Expression (7) (hereinafter, referred to as "Vf" in some cases), is not particularly limited and is preferably 10 Vol % to 70 Vol %.

$$Vf=100*\text{volume of carbon fibers}/(\text{volume of carbon fibers}+\text{volume of thermoplastic resin}) \quad \text{Expression (7)}$$

When Vf is 10% or more, the thermal stability of the composite material is likely to be unstable at the time of cold pressing, which is a problem of the present invention. When the content of the carbon fibers is increased, thermal conductivity is increased and heat after the composite material is heated is likely to be radiated to the outside of the composite material. Accordingly, as Vf is increased, the effect of adjusting Expression (3) of the present invention to have a predetermined value becomes greater.

In addition, when the volume fraction of the carbon fibers in the shaped product is 10 Vol % or more, desired mechanical properties can be obtained. On the other hand, when the volume fraction of the carbon fibers is 70 Vol % or less, the fluidity of the composite material at the time of preparing a shaped product is not deteriorated and a desired shape can be obtained during molding. The volume fraction of the reinforcing fibers in the fiber reinforced resin material is more preferably within a range of 20 Vol % to 60 Vol %, still more preferably within a range of 30 Vol % to 60 Vol %, and even still more preferably within a range of 35 Vol % to 55 Vol %.
[Thermoplastic Resin]

The thermoplastic resin used in one example of the present invention is not particularly limited and a desired thermoplastic resin can be appropriately selected considering excellent mechanical properties and productivity according to applications of the fiber reinforced resin joined body of the present invention.

Examples of the thermoplastic resin include polyolefin resin, polystyrene resin, thermoplastic polyamide resin, polyester resin, polyacetal resin (polyoxymethylene resin), polycarbonate resin, (meth)acrylic resin, polyarylate resin, polyphenylene ether resin, polyimide resin, polyether nitrile resin, phenoxy resin, polyphenylene sulfide resin, polysulfone resin, polyketone resin, polyether ketone resin, thermoplastic polyurethane resin, fluorine-based resin, thermoplastic polybenzimidazole resin, and vinyl resin.

Examples of the polyolefin resin include polyethylene resin, polypropylene resin, polybutadiene resin, polymethyl pentene resin.

Examples of the vinyl resin include polyvinyl chloride resin, polyvinylidene chloride resin, polyvinyl acetate, and polyvinyl alcohol resin.

Examples of the polystyrene resin include polystyrene resin, acrylonitrile-styrene resin (AS resin), and acrylonitrile-butadiene-styrene resin (ABS resin).

Examples of the polyamide resin include polyamide 6 resin (nylon 6), polyamide 11 resin (nylon 11), polyamide 12 resin (nylon 12), polyamide 46 resin (nylon 46), polyamide 66 resin (nylon 66), and polyamide 610 resin (nylon 610).

Examples of the polyester resin include polyethylene terephthalate resin, polyethylene naphthalate resin, polybutylene terephthalate resin, polytrimethylene terephthalate resin, and liquid crystalline polyester.

Examples of the (meth)acrylic resin include polymethyl methacrylate.

Examples of the polyphenylene ether resin include modified polyphenylene ether.

Examples of the thermoplastic polyimide resin include thermoplastic polyimide, polyamide imide resin, and polyether imide resin.

Examples of the polysulfone resin include modified polysulfone resin, and polyether sulfone resin.

Examples of the polyether ketone resin include polyether ketone resin, polyether ether ketone resin, and polyether ketone ketone resin.

Examples of the fluorine-based resin include polytetrafluoroethylene.

The thermoplastic resin used in the present invention may be a copolymer or a modification. Only one type of resin may be used or two or more types of resins may be used. In the case of using two or more types of thermoplastic resins together, for example, thermoplastic resins having different softening points or melting points from each other are used together or thermoplastic resins having different average molecular weight from each other are used together. There is no limitation thereto.

In addition, additives such as various fibrous fillers such as organic fibers or inorganic fibers or non-fibrous fillers, a flame retardant, an anti-UV agent, a stabilizing agent, a releasing agent, a pigment, a softening agent, a plasticizer, thermohardening resin, and a surfactant may be included in the fiber reinforced resin used in the present invention within a range of not impairing the object of the present invention.

Regarding the adhesive strength between the carbon fibers and the thermoplastic resin, the strength of a strand tensile shear test is desirably 5 MPa or more. This strength can be improved by a method of changing the surface oxygen concentration ratio (O/C) of the carbon fibers in addition to selection of the matrix resin.

[Sizing Agent]

The sizing agent in the present invention is not particularly limited and compounds having a functional group such as an epoxy group, a urethane group, an amino group, a carboxyl group, or the like can be used. These compounds may be used alone or in combination of two or more thereof.

Further, a method of applying the sizing agent is not particularly limited and for example, the sizing agent is generally applied to carbon fibers by preparing a sizing agent treatment liquid obtained by dissolving (also including dispersing) a sizing agent in a solvent (including a dispersion medium in the case of dispersing), applying the treatment liquid to carbon fibers, and then drying and vaporizing the solvent for removal. As a method of applying the treatment liquid to the carbon fibers, there are a method of immersing carbon fibers into a sizing agent treatment liquid through a roller, a method of bringing carbon fibers into contact with a roller with a sizing treatment liquid, a method of spraying a sizing agent treatment liquid and blowing carbon fibers, and the like.

[Thickness of Composite Material]

The thickness of the composite material of one example in the present invention is 0.3 mm or more. When the thickness is less than 0.3 mm, the material heated at the time of cold pressing is cooled to the melting point or lower before being charged into a mold and molding is difficult.

The thickness of the composite material is not particularly limited as long as the thickness thereof is 0.3 mm or more. However, the thickness is preferably 0.4 mm or more and 10.0 mm or less.

When the thickness is 0.3 mm or more, the stability of the resin in a molten state when the composite material is heated to the melting point of the thermoplastic resin or higher at the time of cold pressing and transferred to the mold becomes good, and the surface appearance of the shaped product is not deteriorated or mechanical properties are not deteriorated. Further, when the thickness is 10.0 mm or less, the thermoplastic resin is likely to be melted even in the case in which a heating time before cold pressing is relatively short. Thus, adverse effects such as deterioration in productivity of the shaped product and deterioration of the resin due to heating for a long period of time are hardly exhibited.

The thickness of the composite material is more preferably 0.4 mm or more and 5.0 mm or less and still more preferably 0.4 mm or more and 2.0 mm or less.

When the composite material of one example in the present invention has a configuration having a structure in which plural layers are layered, the thickness does not refer to the thickness of each layer but refers to the total of the thickness of each layer. The composite material of one example in the present invention may have a single layer structure or a layered structure formed by layering plural layers.

Further, the composite material of one example in the present invention may be layered on an isotropic base material in which discontinuous carbon fibers are randomly dispersed to form a layered material like a layered material as described in JP-A-2011-241338.

[Width of Composite Material]

The width of the composite material is not particularly limited and is preferably 20 mm or more and 2,000 mm or less. The width of the composite material is more preferably 20 mm to 1,000 mm.

[Method of Producing Composite Material]

Figure 2:
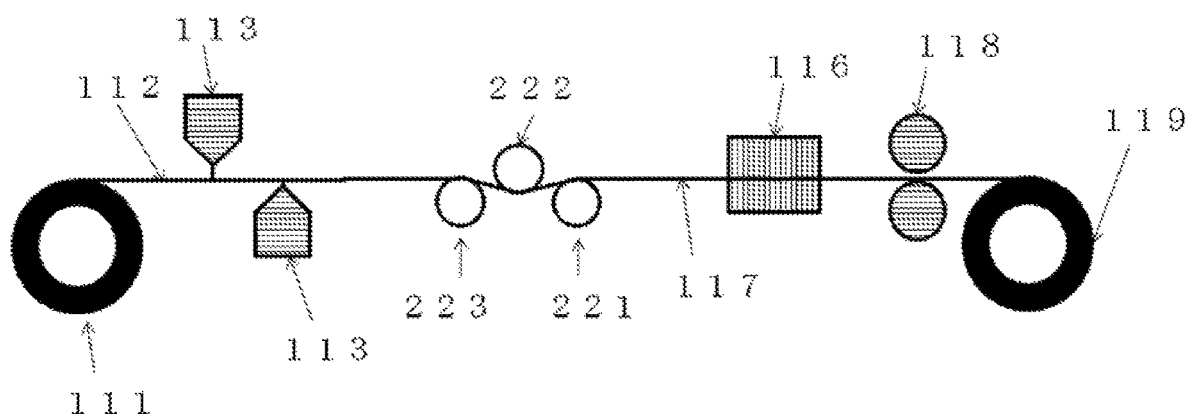
FIG. 2 shows a schematic view of another example of a method of producing a composite material.

As long as the composite material of one example in the present invention can be obtained, the production method is not particularly limited. Various production methods can be used. For example, methods of adopting a double belt press system (FIG. 1) and a heat bar system (FIG. 2) can be used. In these production methods, one reinforced carbon fiber sheet or plural reinforced carbon fiber sheet (112 in FIGS. 1 and 2) are prepared from one or two or more widened carbon fiber bundle (111 in FIGS. 1 and 2) and a molten thermoplastic resin discharged from a molten resin discharge mold (113 in FIGS. 1 and 2) is placed on one surface or both surfaces of the sheet material (both surfaces in FIGS. 1 and 2) to integrate the carbon fibers and the thermoplastic resin. In FIGS. 1 and 2, the layer of the thermoplastic resin is layered on the both surfaces of the carbon fiber sheet. However, the layer of the thermoplastic resin may be placed as a center layer and the carbon fiber sheet may be layered on both sides for integration.

A double belt press apparatus used is an apparatus which performs heating, pressurizing, and cooling-molding the composite material in a state in which the composite material is interposed between two belts (FIG. 1).

Next, using a heatable double belt press machine (115 in FIG. 1) or heat bars (221, 222 and 223 in FIG. 2), in the case in which the thermoplastic resin is a crystalline resin, the integrated body is heated to the melting point thereof or higher and a temperature which is 80° C. higher than the melting point or lower, or the decomposition temperature or lower. In the case in which the resin is a non-crystalline resin, the integrated body is heated to a temperature which is 100° C. higher than the glass transition temperature or higher and a temperature which is 200° C. higher than the glass transition temperature or lower, or the decomposition temperature or lower. The carbon fibers are impregnated with the resin under pressure such that the number of carbon fibers in which less than 50% of the surface is covered with at least one of the thermoplastic resin and sizing agent is 10% or less and then released from the double belt (or heat bars) to prepare a composite material precursor (117 in FIGS. 1 and 2).

(Composite Material Produced from Composite Material Precursor)

The method of producing the composite material of one example in the present invention is not particularly limited. It is preferable to produce the composite material using a jig (116 in FIGS. 1 and 2) which adjusts the cross-sectional area of the composite material precursor (117 in FIGS. 1 and 2) including carbon fibers which are unidirectional continuous fibers and a thermoplastic resin.

For example, in the method of producing the composite material shown in FIGS. 1 and 2, the composite material precursor is heated using the heated jig (116 in FIGS. 1 and 2). In the case in which the thermoplastic resin is a crystalline resin, the composite material precursor is heated to the melting point or higher and a temperature which is 130° C. higher than the melting point, or the decomposition temperature or lower. In the case in which the thermoplastic resin is a non-crystalline resin, the composite material precursor is heated to a temperature which is 100° C. higher than the glass transition temperature or higher and a temperature which is 250° C. higher than the glass transition temperature or lower, or the decomposition temperature or lower. Thereafter, the cross-sectional area or cross-sectional shape of the composite material precursor is adjusted and then cooled to the melting point or lower in the case in which the thermoplastic resin is a crystalline resin and cooled to the glass transition temperature or lower in the case in which the thermoplastic resin is a non-crystalline resin. Thus, a desired composite material (119 in FIGS. 1 and 2) can be produced. In the composite material precursor (117 in FIGS. 1 and 2) shown in FIGS. 1 and 2, a large amount of bubbles are present in the thermoplastic resin. However, the second side of Expression (3) can be adjusted to have a desired value by removing the bubbles using the jig (116 in FIGS. 1 and 2).

(Other Production Examples of Composite Material Produced from Composite Material Precursor)

Figure 4:
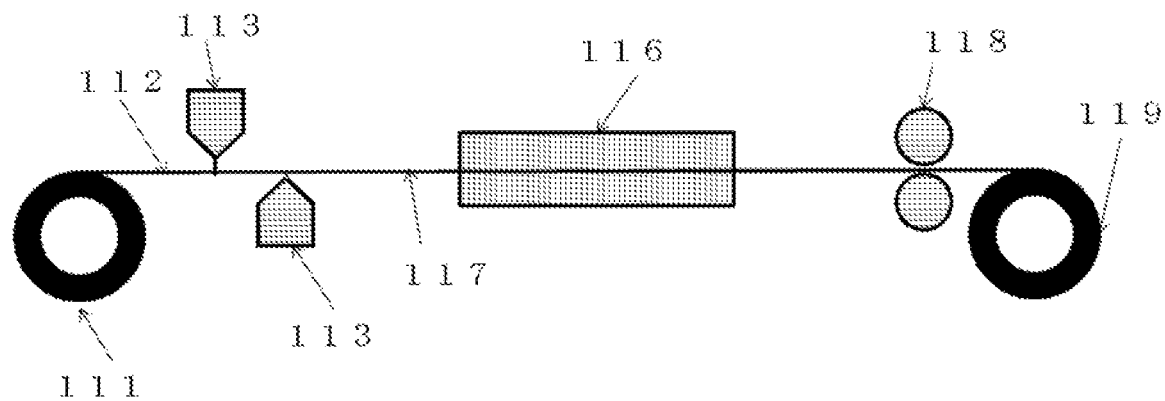
FIG. 4 shows a schematic view of another example of a method of producing a composite material.

As other methods of producing the composite material of the present invention, for example, as shown in FIG. 4, without using the double belt press or heat bars, using only the heated jig (116 in FIG. 4), a composite material that satisfies Expressions (1), (2), and (3) may be produced. In this case, a composite material precursor is different from the composite material precursor (117 in FIGS. 1 and 2) shown in FIGS. 1 and 2 and refers to the composite material precursor (117 in FIG. 4) immediately before entering the jig (116 in FIG. 4). Using the jig (116 in FIG. 4), the thermoplastic resin included in the composite material precursor (117 in FIG. 4) is impregnated into the carbon fibers under pressure and the second side of Expression (3) related to the composite material (119 in FIG. 4) can be adjusted to have a desired value.

In FIGS. 1, 2 and 4, since the composite material 119 is wound. However, when the thickness of the composite material is thick and the composite material cannot be wound, the composite material may be cut and used as it is without winding.

(Shape of Jig)

Since the carbon fibers of one example in the present invention are continuous fibers, a very simple jig can be used to adjust the second side of Expression (3) to have a desired value. When the type of the fiber is woven fabric or non-woven fabric, it is not possible to adjust the value of the second side so as to satisfy the parameter of Expression (3) only with the simple jig.

For example, when the jig (116 in FIGS. 1, 2 and 4) has a hollow, the area of the hollow portion of the jig (116 in FIGS. 1, 2 and 4) may be adjusted with respect to the cross-sectional area of the composite material precursor in the axial direction of the continuous fiber so that the second side of Expression (3) has a desired value.

More specifically, the jig is a hollow jig for inserting the composite material precursor and it is preferable that the minimum cross-sectional area St of the hollow jig satisfies the following Expression (5).

$$(Sf+Sr) < St(Sf+Sr)*1.3 \qquad \text{Expression (5)}$$

Sf: Area of carbon fibers included in the composite material when observed from the cross-sectional direction perpendicular to the continuous fiber direction Sr: Area of thermoplastic resin included in the composite material when observed from the cross-sectional direction perpendicular to the continuous fiber direction When the minimum cross-sectional area St of the hollow jig is more than (Sf+Sr), the mechanical properties when a shaped product is formed become stable. In contrast, when the minimum cross-sectional area St is less than (Sf+Sr)*1.3, the melt stability of the thermoplastic resin included in the composite material at the time of cold pressing is improved. The minimum cross-sectional area St is preferably (Sf+Sr)*1.01<St<(Sf+Sr)*1.25. The minimum cross-sectional area St is more preferably (Sf+Sr)*1.02<St<(Sf+Sr)*1.2.

(Conventional Art)

Regarding the method of producing the composite material, for example, in a method of producing a unidirectional reinforcing fiber sheet disclosed in JP-A-10-305490, the cross-sectional area of an exit nozzle is smaller than the cross-sectional area of the obtained unidirectional reinforced thermoplastic resin sheet. Although the cross-sectional area of an exit nozzle is smaller than the cross-sectional area of the obtained unidirectional reinforced thermoplastic resin sheet, the porosity is 1% or more. It can be considered that the reason is that the fibers are not impregnated with resin.

That is, as an example of producing the composite material which satisfies Expression (3) in the present invention, adjusting the minimum surface area St of the hollow portion of the hollow jig to be larger than (St+Sr) is an inverse concept of the technical idea disclosed in JP-A-10-305490.

[Production of Shaped Product]

When the composite material is cold-pressed to produce a shaped product, cold pressing may be carried out such that the density dm of the shaped product is $(1-dm/(dr*(Vr/100)+df*(Vf/100))) < (1-dc/(dr*(Vr/100)+df*(Vf/100)))*0.8$. When the value of $(1-dm/(dr*(Vr/100)+df*(Vf/100)))$ is equal to or lower than 0.8 times of $(1-dc/(dr*(Vr/100)+$ df*(Vf/100))), the mechanical properties of the shaped product can be ensured and thus this case is preferable. The value of (1−dm/(dr*(Vr/100)+df*(Vf/100))) is preferably equal to or lower than 0.5 times of (1−dc/(dr*(Vr/100)+df*(Vf/100))), more preferably equal to or lower than 0.3 times of (1−dc/(dr*(Vr/100)+df*(Vf/100))), and still more preferably equal to or lower than 0.2 times of (1−dc/(dr*(Vr/100)+df*(Vf/100))).

It is preferable that a shaped product is produced such that the specific density dm of the shaped product satisfies Expression (4) 0≤(1−dm/(dr*(Vr/100)+df*(Vf/100)))≤0.08.

The value of (1−dm/(dr×(Vr/100)+df×(Vf/100))) defined by Expression (4) indicates a so-called filling rate of the shaped product and a difference obtained by subtracting the value from 1 refers to a ratio of voids included in the shaped product ((1−dm/(dr×(Vr/100)+df×(Vf/100))) is referred to as the second side of Expression (4) in some cases).

When the value defined by the second side of Expression (4) is 0.08 or less, voids in the shaped product hardly function as a defect and local deterioration in the mechanical properties of the shaped product hardly occurs.

That is, the inventor has produced a shaped product by melting the thermoplastic resin included in the composite material, when the composite material in which the value defined by the second side of Expression (3) is adjusted to be within a fixed range is cold-pressed so that a shaped product defined by the second side of Expression (4) is obtained. Accordingly, the inventor has found a method of producing a shaped product capable of maintaining high mechanical properties when a shaped product is formed while improving the stability of the thermoplastic resin included in the composite material in a molten state at the time of cold pressing.

Regarding this point, in the paragraph 0014 of JP-A-2004-223743, there is disclosed a unidirectional impact absorbing material in which while the impregnation state is good, a large number of voids are observed and a result, the porosity is high. In the technique disclosed in JP-A-2004-223743, since the hot pressing conditions are mild, voids remain in the shaped product after hot pressing. On the other hand, the composite material of one example in the present invention is provided for cold pressing and the numbered of voids in the shaped product after cold pressing is reduced. Accordingly, the technical idea is different from the concept of improving the thermal stability of the composite material of one example in the present invention, and the stability of the thermoplastic resin included in the composite material in a molten state.

In addition, since the material is heated at the time of pressing in hot pressing, a problem of maintaining thermal stability at the time of cold pressing in the present invention is not present in the technique disclosed in JP-A-2004-223743.

The upper limit defined by the second side of Expression (4) is preferably 0.05, more preferably 0.03, still more preferably 0.01, even still more preferably 0.005, and most preferably 0.001.

EXAMPLES

Hereinafter, examples will be shown, but the present invention is not limited to these examples.
[Material Used]
(1) Carbon Fibers
  Sizing agent applied carbon fibers "Tenax" (registered trademark) STS40-24K, produced by TOHO TENAX Co., Ltd. (average fiber diameter: 7 μm), Density: 1.75 g/cm$^3$ (2) Thermoplastic Resin
(2-1) Nylon 60
  Nylon 6 resin A1030 produced by UNITIKA LTD.
  Density: 1.13 g/cm$^3$
  Melting point: about 220° C.
(2-2) Polycarbonate (PC)
  Panlite (registered trademark) K-1300Y produced by TEIJIN LIMITED
  Density: 1.20 g/cm$^3$
  Glass transition temperature: about 145° C.
(2-3) Polyethylene Terephthalate (PET)
  Polyethylene terephthalate resin TRN-8550FF produced by TEIJIN LIMITED
  Density: 1.40 g/cm$^3$
  Glass transition temperature: about 252° C.
[Evaluation Method]

Each value in examples was obtained by the following manner.

(1) Ratio (n1/N) of Number of Carbon Fibers in which Less than 50% of Surface is Covered with at Least One of Thermoplastic Resin and Sizing Agent The composite material was cut so that the cross section could be observed from the direction perpendicular to the continuous fiber direction and the thermoplastic resin covering state of 100 random carbon fibers was observed from one view field (1.0 mm×1.0 mm) using an optical microscope (VHX-1000 produced by KEYENCE CORPORATION) to count the number of carbon fibers in which less than 50% of the outer periphery of the carbon fibers was covered with the thermoplastic resin. This operation was repeatedly carried out 5 times while changing the observation sites. The thermoplastic resin covering state of a total of 500 carbon fibers was observed and the number (n1) of carbon fibers in which less than 50% of the surface was covered with at least one of the thermoplastic resin and sizing agent was counted. n1 was divided by 500 fibers which is the number of observed fibers to obtain n1/N.

(2) Ratio (p) of Number of Carbon Fibers which are not Substantially Covered with any One of Thermoplastic Resin and Sizing Agent The end portion of the composite material cut into a width of 100 mm was cut off in a direction perpendicular to the fiber direction of the continuous fiber, and a portion 10 mm away from the cut end portion of the composite material (hereinafter, referred to as an "initial end portion" in some cases) was bent by using a bending part of a shearing bender (BG20-HS) produced by CGK CORPORATION in a direction perpendicular to the fiber direction of the continuous fiber.

It was observed that about only less than 10% of the surface of the carbon fibers projecting from the end portion which was newly formed by pulling out the bent portion (the portion 10 mm away from the initial end portion) was not covered with any of the thermoplastic resin and the sizing agent and these fibers were cut with scissors. The weight Wa of the carbon fibers projecting from the newly formed end portion was measured.

At this time, since the carbon fibers in which about 10% or more of the surface of the carbon fibers was covered with at least one of the thermoplastic resin and sizing agent remained at the bent portion (the portion 10 mm away from the initial end portion), the bent portion (the portion 10 mm away from the initial end portion) was out into an alumina crucible and the crucible was covered with a lid. Using a muffle furnace (FP410, produced by YAMATO SCIENTIFIC, CO., LTD.), a heat treatment was carried out for 40 minutes at 550° C. under the atmosphere so that only the thermoplastic resin constituting the composite material was completely burned. The weight Wb of the remaining carbon fibers was measured.

The above operation was repeatedly carried out 3 times for one composite material. The operation was carried out 15 times in total for 5 sheets of the composite material and the value of Wa/(Wa+Wb) was calculated from the average value of the respectively measured Wa and Wb to set the obtained value as the value of p.

(3) Density Dc of Composite Material and Density Dm of Shaped Product

The composite material (or the shaped product) was cut into a square having a side of 50 mm and dried for 2 hours using a hot air dryer heated to 100° C. The dry weight W1 was measured with an electronic balance. Next, the same sample was immersed in water and the underwater weight W2 was measured. The density dc of the composite material (or the density dm of the shaped product) was calculated from Expression (6-1) (or Expression (6-2)). The unit of the calculated density was g/cm³.

In addition, as described above, unless otherwise particularly specified, the density in the same expression in the specification are shown based on the same unit.

$$dc=dw*W1/(W1-W2)(dw: \text{Water density}) \quad \text{Expression (6-1)}$$

$$dm=dw*W1/(W1-W2)(dw: \text{Water density}) \quad \text{Expression (6-2)}$$

(4) Evaluation of Thermal Stability of Composite Material

The composite material was heated to 280° C. using a hot air circulation type heating furnace, and then the surface temperature of the sample was measured after 20 seconds had elapsed since being held in a space of 23° C. The lowered temperature ΔT was set as an evaluation value.

(5) Evaluation after Cold Pressing

The composite material was cut into a piece of 200 mm×100 mm (200 mm in the fiber direction of the continuous fiber) and heated using a hot air circulation type heating furnace. In the case in which the thermoplastic resin is a crystalline resin, the composite material was heated to the melting point or higher and a temperature 80° C. higher than the melting point or lower, or the decomposition temperature or lower. In the case in which the thermoplastic resin is a non-crystalline resin, the composite material was heated to a temperature 100° C. higher than the glass transition temperature or higher and a temperature 200° C. higher than the glass transition temperature or lower, or the decomposition temperature or lower. After 20 seconds since the heated composite material was taken out of the hot air circulation type heating furnace, the composite material was put into a plate-like mold (having a cavity size of 210 mm×100 mm) heated to a temperature lower than the melting point in the case of a crystalline resin or a temperature lower than the glass transition temperature in the case of a non-crystalline resin, and the mold was closed. A load of 21 Ton was applied thereto and cold pressing was carried out for 50 seconds.

(Evaluation 1) The prepared shaped product was subjected to a bending test according to the procedure of JIS K 7017 (1999) when n=10 (10 test pieces), and the average value of bending strength and the average value of bending modulus were calculated.

(Evaluation 2) From the bending test results, a standard deviation σ was calculated and the number of test pieces having a value smaller than a value obtained by subtracting σ from the average value was confirmed. Through this evaluation method, the defects of the shaped product obtained in cold pressing were confirmed.

(Evaluation 3) Regarding the prepared molding plate, the smoothness of the appearance and mold transferability were confirmed and the following evaluation was carried out.
Excellent: Very good
Good: Satisfactory
Unsatisfactory: Partially good but poor
Poor: Apparently poor Evaluation with four stages was carried out and the largest number of evaluation was set as the appearance evaluation of the shaped product.

(6) Cross-Sectional Area of Carbon Fibers and Thermoplastic Resin (6-1)

Sf: Area of carbon fibers included in the composite material when observed from the cross-sectional direction perpendicular to the continuous fiber direction The cross-sectional area of carbon fibers of "Tenax" (registered trademark) STS40-24K, produced by TOHO TENAX Co., Ltd. is 24,000 π(D/2)² (about 0.92 mm²). A value obtained by multiplying the cross-sectional area by the number of spindles used was set as the value of St. Here, D refers to the diameter of a carbon fiber single yarn.

(6-2)

Sr: Area of thermoplastic resin included in the composite material when observed from the cross-sectional direction perpendicular to the continuous fiber direction The composite material was produced by adjusting the amount of thermoplastic resin discharged so as to have a desired volume ratio (Vf) of carbon fibers in each example. Therefore, the cross-sectional area Sr of the thermoplastic resin was obtained by inverse calculation from the Vf value.

Example 1

The carbon fibers were unwound from a creel (84 weight (not shown)) and by adjusting the amount of molten nylon 6 discharged from the molten resin discharge mold (113 in FIG. 2) to the unidirectional carbon fiber sheet (112 in FIG. 2) such that the volume ratio (Vf) of the carbon fibers is 50%, the nylon 6 was placed on the both surfaces to integrate the carbon fiber sheet and the thermoplastic resin.

Next, through the heat bars (221, 222 and 223 in FIG. 2) heated to the melting point of the molten resin or higher, the thermoplastic resin was impregnated into the unidirectional carbon fiber sheet 112.

Figure 3:
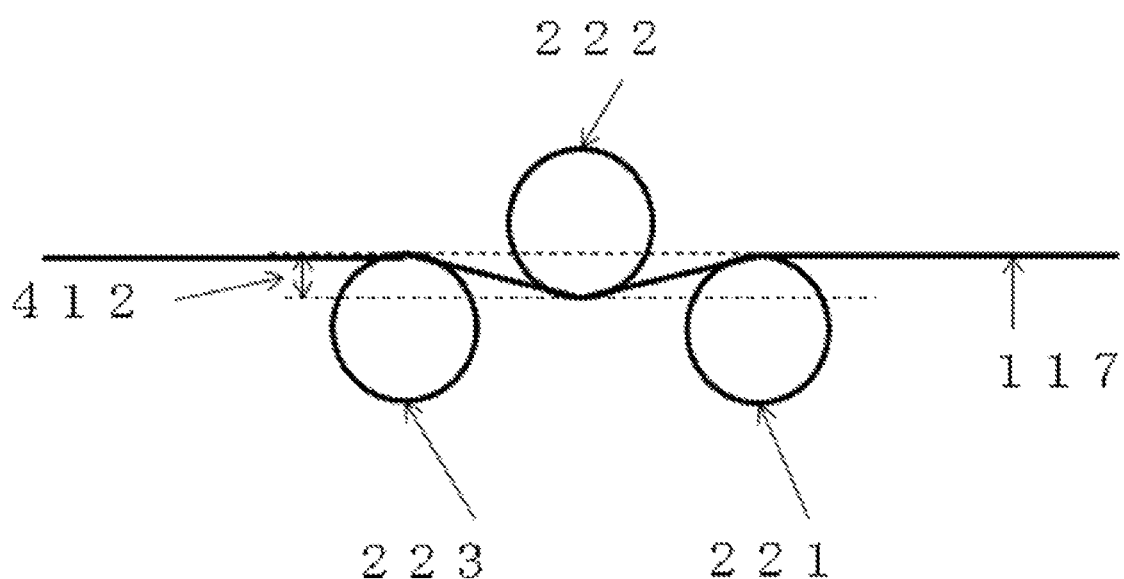
FIG. 3 shows a schematic view of heat bars.

FIG. 3 shows a partially enlarged view of the heat bars 221, 222 and 223. The heat bar 222 provided between the heat bars 221 and 223 was vertically adjustable and the thermoplastic resin covering state of the carbon fiber surface was controlled by adjusting a sinking distance (412 in FIG. 2) to 10 mm. The cross-sectional area of the composite material (the width and thickness of the composite material) was determined by making the material pass through the jig 116 for adjusting the cross-sectional area of the composite material precursor after passing through the heat bars 221, 222 and 223. The jig of a hollow rectangular shape having a thickness of 1.05 mm and a width of 150 mm (cross-sectional are of 157.5 mm²) was used. The composite material precursor passed through the jig and then passed through a cooling roller 118. Thus, the temperature of the sample was lowered to the melting point or lower of the thermoplastic resin to obtain a composite material 1.

The thickness of the obtained composite material 1 was not uniform, and the thickness was measured at 10 points using a micrometer to obtain the average value. The average value was 1.03 mm and the width was 150 mm.

Using a hot air circulation type heating furnace, the composite material 1 was heated to 290° C. and placed in a mold of 130° C. and the mold was closed. Cold pressing was carried out to obtain a shaped product. The results are shown in Table 1.

In the shaped product after the cold pressing, the number of voids was reduced compared to the composite material and the value of 1−dm/(dr*(Vr/100)+df*(Vf/100)) which is the second side of Expression (4) was "<0.001". Here, "<0.001" refers to a value smaller than 0.001.

Example 2

A composite material 2 was prepared in the same manner as in Example 1 except that carbon fibers of 42 spindles were unwound from the creel and the thickness of the jig for controlling the cross-sectional area was adjusted to 0.53 mm. The thickness of the obtained composite material 2 was measured at 10 points using a micrometer to obtain the average value. The average value was 0.52 mm. In addition, the composite material 2 was cold-pressed as in Example 1. The results are shown in Table 1.

Example 3

A composite material 3 was prepared in the same manner as in Example 1 except that the thickness of the jig for controlling the cross-sectional area was adjusted to 1.10 mm. The thickness of the obtained composite material was measured at 10 points using a micrometer to obtain the average value. The average value was 1.07 mm. In addition, the composite material 3 was cold-pressed as in Example 1. The results are shown in Table 1.

Example 4

Under the same apparatus conditions as in Example 1, the number of spindles of carbon fibers of the same product was changed to 126 and the thickness of the jig for controlling the cross-sectional area was adjusted to 1.60 mm to prepare a composite material 4. The thickness of the obtained composite material 4 was measured at 10 points using a micrometer to obtain the average value. The average value was 1.57 mm. In addition, the composite material 4 was cold-pressed as in Example 1. The results are shown in Table 1.

Example 5

Two composite materials 4 obtained in Example 4 were layered to obtain a layered body 1 having a double thickness. The thickness of the layered body 1 was measured at 10 points using a micrometer to obtain the average value. The average value was 3.06 mm. In addition, the layered body 1 was cold-pressed as in Example 1. The results are shown in Table 1.

Example 6

A composite material 6 was prepared in the same manner as in Example 1 except that under the same apparatus conditions as in Example 1, the number of spindles of carbon fibers of the same product was changed to 68 and the amount of molten nylon 6 discharged was adjusted such that the volume ratio (Vf) of carbon reached about 40%. The thickness of the obtained composite material 6 was measured at 10 points using a micrometer to obtain the average value. The average value was 1.04 mm. In addition, the composite material 6 was cold-pressed as in Example 1. The results are shown in Table 1.

Example 7

A composite material 7 was prepared in the same manner as in Example 1 except that under the same apparatus conditions as in Example 1, the number of spindles of carbon fibers of the same product was changed to 100 and the amount of molten nylon 6 discharged was adjusted such that the volume ratio (Vf) of carbon reached about 60%. The thickness of the obtained composite material 7 was measured at 10 points using a micrometer to obtain the average value. The average value was 1.01 mm. In addition, the composite material 7 was cold-pressed as in Example 1. The results are shown in Table 1.

Example 8

A composite material 8 was prepared using the same material under the same conditions as in Example 1 except that the thermoplastic resin was changed to polycarbonate "Panlite" (registered trademark) K-1300Y produced by TORN LIMITED. The thickness of the obtained composite material 8 was measured at 10 points using a micrometer to obtain the average value. The average value was 1.03 mm.

The composite material 8 was cold-pressed as in Example 1 except that the material was heated to 300° C. The results are shown in Table 1.

Example 9

A composite material 9 was prepared using the same material and the same conditions as in Example 1 except that the thermoplastic resin was changed to a polyethylene terephthalate resin TRN-8550FF produced by TEIJIN LIMITED. The thickness of the obtained composite material 9 was measured at 10 points using a micrometer to obtain the average value. The average value was 1.03 mm.

The composite material 9 was cold-pressed as in Example 1 except that the material was heated to 320° C. The results are shown in Table 1.

Examples 10 to 12

Composite materials were prepared in the same manner as in Example 1 except that the number of spindles of carbon fibers was respectively changed to 8, 16, and 32, the volume ratio (Vf) of carbon fibers included the composite material was adjusted to about 5%, 10%, and 20%, and the composite materials were respectively set to a composite material 10, a composite material 11, and a composite material 12. The thermal stability of each of these composite materials 10 to 12 was evaluated. The results are shown in Table 2.

It is found that there is a tendency that the lowered temperature ΔT increases as the volume ratio (Vf) of the carbon fibers included in the composite material increases.

Example 13

The carbon fibers were unwound from a creel (84 weight (not shown)) and by adjusting the amount of molten nylon 6 discharged from the molten resin discharge mold (113 in FIG. 1) to the unidirectional carbon fiber sheet (112 in FIG.

1) such that the volume ratio (Vf) of the carbon fibers is 50%, the nylon 6 was placed on the both surfaces to integrate the carbon fiber sheet and the thermoplastic resin.

Next, the materials were put into a double bend press apparatus (115 in FIG. 1) under the conditions of a setting temperature of 290° C. and a passing time of 3 minutes so that the thermoplastic resin was impregnated into the unidirectional carbon fiber sheet.

When the composite material passed through the double bend press apparatus, the pressure was set to 1.0 MPa and the thermoplastic resin covering state of the surface of the carbon fibers was adjusted. By adjusting the setting pressure of the double belt, the cross-sectional area of the composite material (the width and the thickness of the composite material) was adjusted and thus the jig (116 in FIG. 1) was not used. After the sample passed through and then cooling roller 118, the temperature of the sample was lowered to the melting point of the thermoplastic resin or lower to obtain a composite material 13. The thickness of the obtained composite material 13 was not uniform, and the thickness was measured at 10 points using a micrometer to obtain an average value. The average value was 0.91 mm and the width was 170 mm.

The composite material 13 was heated to 290° C. using a hot air circulation type heating furnace and put into a mold of 130° C. and the mold was closed. The composite material was cold-pressed to obtain a shaped product. The results are shown in Table 1.

Comparative Example 1

A comparative composite material 1 was prepared using the same material and the same conditions as in Example 1 by changing the heater sinking distance (412 in FIG. 3) 3 mm. The thickness of the obtained comparative composite material 1 was measured at 10 points using a micrometer to obtain an average value. The average value was 1.04 mm.

The comparative composite material 1 was cold-pressed as in Example 1. The results are shown in Table 3.

The comparative composite material 1 could not satisfy Expression 1 (n1/N≤0.1) and Expression 2 (p<0.01). Since the degree of covering the fibers with the resin was low, the strength of the shaped product obtained by cold pressing was low compared to the strength of the shaped product of the working examples and the value of $1-dm/(dr*(Vr/100)+df*(Vf/100))$ was also >0.001 (a value larger than 0.001).

Comparative Example 2

A comparative composite material 2 was prepared using the same material and the same conditions as in Example 1 by adjusting the thickness of the jig for adjusting the cross-sectional area of the composite material precursor to 0.98 mm. Since the thickness of the jig was set to extremely small in order to reduce the number of voids as much as possible, at the time of passing through the jig, the thermoplastic resin was scraped off by the jig. As a result, the target value of the volume ratio (Vf) of the carbon fibers was set to 50%, but had a value higher than 50%. In addition, the value defined by $1-dc/(dr*(Vr/100)+df*(Vf/100))$, which is the second side of Expression (3), was <0.001 (a value less than 0.001).

The thickness of the comparative composite material 2 was measured at 10 points using a micrometer to obtain an average value. The average value was 0.99 mm.

When the comparative composite material was cold-pressed in the same manner as in Example 1, the molten state of the thermoplastic resin included in the composite material was not stable and thus the handleability of the heated composite material was poor. Also, the surface of the material was solidified while being transferred to the mold. The results are shown in Table 3.

Comparative Example 3

A comparative composite material 3 was prepared using the same material and the same conditions as in Example 1 by adjusting the thickness of the jig for adjusting the cross-sectional area of the composite material precursor to 1.30 mm. The thickness of the comparative composite material 3 was measured at 10 points using a micrometer to obtain an average value. The average value was 1.17 mm. Large voids was tried to be embedded in the composite material. However, air leaked and there was a big difference between the setting thickness in the jig the thickness of the composite material.

When the comparative composite material 3 was cold-pressed as in Example 1, the handleability of the heated composite material was good. However, slight recesses and protrusions such as wrinkles were found in the appearance of the shaped product. When the cross section of the shaped product was observed with a microscope, voids were found in various places of the resin portion. The results are shown in Table 3.

Comparative Example 4

A comparative composite material 4 was prepared under the same conditions as in Example 1 except that the number of spindle of carbon fibers of the same product was changed to 21 and the thickness of the jig for adjusting the cross-sectional area was adjusted to 0.28 mm. The thickness of the comparative composite material 4 was measured at 10 points using a micrometer to obtain an average value. The average value was 0.26 mm.

When the comparative composite material 4 was cold-pressed as in Example 1, due to the thin thickness of the composite material, the material was cooled to the molting point or lower before the heated composite material was charged into the mold. The cold pressing was continued as it was. However, the plate-like shaped product was not obtained. The results are shown in Table 3.

Reference Example 1

A reference material 1 was obtained by adjusting the amount of polypropylene discharged to E-glass fibers (single yarn diameter: 13 μm, the number of single yarns: 1,600 yarns) to have a Vf of 40% and impregnating the polypropylene into the fibers in the same manner as in Example 1. When the density df of the carbon fibers was substituted by the density of the glass fibers, the value of $1-dm/(dr*(Vr/100)+df*(Vf/100))$ was 0.008.

Reference Example 2

A reference material 2 was obtained by adjusting the amount of polypropylene discharged to E-glass fibers (single yarn diameter: 13 μm, the number of single yarns: 1,600 yarns) to have a Vf of 40% and impregnating the polypropylene into the fibers in the same manner as in Comparative Example 2. When the density df of the carbon fibers was substituted by the density of the glass fibers, the value of $1-dm/(dr*(Vr/100)+df*(Vf/100))$ was 0.001 or less.

The stability of each of the reference materials 1 and 2 in a molten state was compared to each other for evaluation and the lowered temperature ΔT was evaluated. The results are shown in Table 4. From these results, it is found that there is no difference in ΔT between the reference materials 1 and 2 and a problem that the thermal stability of the composite material at the time of cold pressing is not stable when the glass fibers are used does not arise.

Reference Example 3

The composite material 1 was hot-pressed under the conditions of a mold temperature of 270° and a pressure of 2.0 MPa for 5 min to produce a shaped product. The results are shown in Table 5.

Reference Example 4

The comparative composite material 1 was hot-pressed under the same conditions as in Reference Example 3 to prepare a shaped product. The results are shown in Table 5.

Reference Example 5

The comparative composite material 3 was hot-pressed under the same conditions as in Reference Example 3 to prepare a shaped product. The results are shown in Table 5.

From the results of Reference Examples 3, 4 and 5, when the materials were hot-pressed, a problem that the thermal stability of the composite materials was not stable at the time of cold pressing did not arise. Thus, in both hot pressing and cold pressing, the value for the surface appearance was good. In addition, when the composite material 1, the comparative composite material 1, and the comparative composite material 3 were molded by hot pressing, most of voids disappeared after molding and the value of the second side of Expression (4) of each shaped product was "<0.001".

Comparative Example 5

The unidirectionally oriented carbon fiber reinforced sheet disclosed in JP-A-2012-149170 was prepared and hot-pressed to prepare a comparative composite material 5.

Specifically, a resin composition obtained by blending 45% by weight of HYDRAN HW-301 (polyester-based urethane, produced by DIC Corporation) as a polyurethane resin, and 55% by weight of polyoxyethylene (15) lauryl glycidyl ether (POE(15)LGE: produced by Matsumoto Yushi-Seiyaku Co., Ltd.) as a polyether resin was dissolved in water to prepare a sizing agent solution having a density of 30 g/l. In the sizing agent solution bath, non-sized carbon fiber strands (registered trademark "Tenax STS-24K N00", produced by TOHO TENAX Co., Ltd.) were immersed and then surplus moisture was removed by a roller. Then the fiber strands were dried at 140° C. for 3 minutes to obtain continuous carbon fiber strands.

The obtained carbon fiber strands were in sliding contact with four fiber-opening bars that were arranged in zigzags along the traveling direction and were arranged in unidirection while being widened to 16 mm so as to be sheet form. Acid modified polypropylene resin films were placed above and below the obtained sheet such that the weight of the acid modified polypropylene resin with respect to 100 parts by weight of carbon fibers was 52 parts by weight. The film was attached to the sheet by a heating roller of 220° C. to obtain a unidirectionally oriented carbon fiber reinforced composite material sheet. This unidirectionally oriented carbon fiber reinforced composite material sheet was cut to pieces having a size of width 30 cm×length 30 cm and 18 pieces were layered in one direction and heated for 5 minutes at 2.0 MPa by a press apparatus heated to 240° C. Thus, a comparative composite material 5 having a thickness of 2.0 mm was obtained.

The comparative composite material 5 did not satisfy Expression (3) of Claim 1 and the value of $1-dc/(dr*(Vr/100)+df*(Vf/100))$ was smaller than 0.001. When the material was cold-pressed, similar to Comparative Example 2, the appearance determination was unsatisfactory.

Comparative Example 6

The unidirectional material disclosed in JP-A-2013-010255 was prepared and this material was used as a comparative composite material 6.

Specifically, a film of MXD nylon Lenny 6007 (registered trademark), produced by Mitsubishi Gas Chemical Company, Inc., was placed on continuous carbon fibers (registered trademark) STS40-24K, produced by TOHO TENAX Co., Ltd., fiber diameter: 7 μm, tensile strength: 4,000 MPa) such that the resin was 100 parts by volume with respect to 100 parts by volume of carbon fibers, and attached to the fibers by a heating roller of 260° C. to obtain a unidirectional material having a thickness of 0.02 mm and a Vf of 50%. This material was used as a comparative composite material 6.

The melting point of MXD nylon Lenny 6007, produced by Mitsubishi Gas Chemical Company, Inc., was about 243° C. and it was confirmed that a large number of voids were formed in the comparative composite material 6 when attaching of the film to the fibers only by the heating roller of 260° C.

The density dc of the comparative composite material 6 was tired to be measured. However, when the weight was measured in water, due to a large number of voids, the voids were filled with water, and thus the density dc could not be calculated.

Even when the comparative composite material 6 was cold-pressed to obtain a shaped product, the number of voids is not reduced at the time of cold pressing and the impact resistance of the shaped product is locally deteriorated.

TABLE 1

|  | Example 1 | Example 2 | Example 3 | Example 4 | Example 5 |
|---|---|---|---|---|---|
| Number of spindles of carbon fibers | 84 | 42 | 84 | 126 | 126 |
| Density of carbon fibers g/cm³ | 1.75 | 1.75 | 1.75 | 1.75 | 1.75 |
| Thermoplastic resin | Nylon 6 | Nylon 6 | Nylon 6 | Nylon 6 | Nylon 6 |
| Dnesity of thermoplastic resin g/cm³ | 1.13 | 1.13 | 1.13 | 1.13 | 1.13 |

TABLE 1-continued

| Jig | | | | | |
|---|---|---|---|---|---|
| Width mm | 150 | 150 | 150 | 150 | 150 |
| Thickness mm | 1.05 | 0.53 | 1.10 | 1.60 | 1.05 |
| St mm² | 157.5 | 79.5 | 165 | 240 | 157.5 |
| Composite material | | | | | |
| Type of composite material | Composite material 1 | Composite material 2 | Composite material 3 | Composite material 4 | Layered body 1 |
| Width mm | 150 | 150 | 150 | 150 | — |
| Thickness mm | 1.03 | 0.52 | 1.07 | 1.57 | — |
| Cross-sectional area mm² | 155 | 78 | 161 | 236 | — |
| Sf mm² | 78 | 39 | 78 | 116 | — |
| Sr mm² | 78 | 39 | 78 | 116 | — |
| Sf + Sr | 155 | 78 | 155 | 233 | — |
| St/(Sf + Sr) | 1.02 | 1.03 | 1.06 | 1.03 | — |
| n1/N | 0.008 | 0.014 | 0.01 | 0.018 | — |
| p | 0.003 | ND | 0.007 | 0.008 | — |
| $1 - dc/(dr \times (Vr/100) + df \times (Vf/100))$ | 0.008 | 0.02 | 0.068 | 0.018 | 0.017 |
| Vf (%) | 50 | 50 | 50 | 50 | 50 |
| Molten state stability evaluation lowered temperature ΔT° C. | 38 | 46 | 24 | 20 | 20 |
| Shaped body | | | | | |
| Bending strength (MPa) | 1624 | 1556 | 1612 | 1532 | 1537 |
| Bending modulus (GPa) | 114 | 110 | 118 | 113 | 112 |
| $1 - dm/(dr \times (Vr/100) + df \times (Vf/100))$ | <0.001 | <0.001 | <0.001 | 0.002 | <0.001 |
| Number of defective fibers | 0 | 1 | 0 | 0 | 0 |
| Appearance determination | Excellent | Good | Excellent | Excellent | Excellent |

| | Example 6 | Example 7 | Example 8 | Example 9 | Example 13 |
|---|---|---|---|---|---|
| Number of spindles of carbon fibers | 66 | 100 | 84 | 84 | 84 |
| Density of carbon fibers g/cm³ | 1.75 | 1.75 | 1.75 | 1.75 | 1.75 |
| Thermoplastic resin | Nylon 6 | Nylon 6 | PC | PET | Nylon 6 |
| Dnesity of thermoplastic resin g/cm³ | 1.13 | 1.13 | 1.20 | 1.40 | 1.13 |
| Jig | | | | | |
| Width mm | 150 | 150 | 150 | 150 | Prepared by double belt press apparatus |
| Thickness mm | 1.05 | 1.05 | 1.05 | 1.05 | |
| St mm² | 157.5 | 157.5 | 157.5 | 157.5 | |
| Composite material | | | | | |
| Type of composite material | Composite material 6 | Composite material 7 | Composite material 8 | Composite material 9 | Composite material 13 |
| Width mm | 150 | 150 | 150 | 150 | 170 |
| Thickness mm | 1.04 | 1.01 | 1.03 | 1.03 | 0.91 |
| Cross-sectional area mm² | 156 | 152 | 155 | 155 | 155 |
| Sf mm² | 61 | 92 | 78 | 78 | Prepared by double belt press apparatus |
| Sr mm² | 91 | 62 | 78 | 78 | |
| Sf + Sr | 152 | 154 | 155 | 155 | |
| St/(Sf + Sr) | 1.03 | 1.02 | 1.02 | 1.02 | |
| n1/N | 0.006 | 0.03 | 0.024 | 0.028 | 0.002 |
| p | ND | 0.008 | 0.006 | 0.009 | ND |
| $1 - dc/(dr \times (Vr/100) + df \times (Vf/100))$ | 0.022 | 0.008 | 0.024 | 0.026 | 0.011 |
| Vf (%) | 40 | 60 | 50 | 50 | 50 |
| Molten state stability evaluation lowered temperature ΔT° C. | 35 | 42 | 35 | 36 | 38 |
| Shaped body | | | | | |
| Bending strength (MPa) | 1256 | 2035 | 1525 | 1627 | 1660 |
| Bending modulus (GPa) | 95 | 138 | 110 | 114 | 120 |

TABLE 1-continued

| | | | | | |
|---|---|---|---|---|---|
| 1 − dm/(dr × (Vr/100) + df × (Vf/100)) | <0.001 | <0.001 | <0.001 | <0.001 | <0.001 |
| Number of defective fibers | 0 | 0 | 0 | 0 | 0 |
| Appearance determination | Excellent | Good | Excellent | Good | Excellent | n1: Number of carbon fibers in which less than 50% of the surface is covered with at least one of the thermoplastic resin and a sizing agent
p: Ratio of the number of carbon fibers which are not substantially covered with any of the thermoplastic resin and the sizing agent
N: Number of carbon fibers included in the composite material
dr: Density of thermoplastic resin, df: Density of carbon fibers (g/cm³)
dc: Density of composite material (g/cm³)
dm: Density of shaped body (g/cm³)
St. Minimun cross-sectional area of hollow portion of hollow jig
Sf: Area of carbon fibers included in the composite material when observed from the cross-sectional direction perpendicular to the continuous fiber direction
Sr: Area of thermoplastic resin included in the composite material when observed from the cross-sectional direction perpendicular to the continuous fiber direction
Vf (%): 100 × carbon fiber volume/(carbon fiber volume + thermoplastic resin volume)
PC: Abbreviation of polycarbonate,
PET: Abbribiation of polyethylene telephthalate
ND: non-detected

TABLE 2

| | Example 10 | Example 11 | Example 12 |
|---|---|---|---|
| Number of spindles of carbon fibers | 8 | 16 | 32 |
| Density of carbon fibers g/cm³ | 1.75 | 1.75 | 1.75 |
| Thermoplastic resin | Nylon 6 | Nylon 6 | Nylon 6 |
| Density of thermoplastic resin g/cm³ | 1.13 | 1.13 | 1.13 |
| Jig | | | |
| Width mm | 150 | 150 | 150 |
| Thickness mm | 1.05 | 1.05 | 1.05 |
| St mm² | 157.5 | 157.5 | 157.5 |
| Composite material | | | |
| Type of composite material | Composite material 10 | Composite material 11 | Composite material 12 |

TABLE 2-continued

| | Example 10 | Example 11 | Example 12 |
|---|---|---|---|
| Width mm | 150 | 150 | 150 |
| Thickness mm | 1.03 | 1.03 | 1.03 |
| Cross-sectional area mm² | 155 | 155 | 155 |
| Sf mm² | 7 | 15 | 30 |
| Sr mm² | 140 | 133 | 118 |
| Sf + Sr | 148 | 148 | 148 |
| St/(Sf + Sr) | 1.07 | 1.07 | 1.07 |
| n1/N | 0.001 | 0.002 | 0.003 |
| p | ND | ND | ND |
| 1 − dc/(dr × (Vr/100) + dfx (Vf/100)) | 0.027 | 0.025 | 0.023 |
| Vf (%) | 5 | 10 | 20 |
| Lowered temperature ΔT° C. (Stability evaluation in molten state) | 21 | 23 | 29 |

TABLE 3

| | Comparative Example 1 | Comparative Example 2 | Comparative Example 3 | Comparative Example 4 |
|---|---|---|---|---|
| Number of spindles of carbon fibers | 84 | 84 | 84 | 21 |
| Density of carbon fibers g/cm³ | 1.75 | 1.75 | 1.75 | 1.75 |
| Thermoplastic resin | Nylon 6 | Nylon 6 | Nylon 6 | Nylon 6 |
| Density of thermoplastic resin g/cm³ | 1.13 | 1.13 | 1.13 | 1.13 |
| Jig | | | | |
| Width mm | 150 | 150 | 150 | 150 |
| Thickness mm | 1.05 | 0.98 | 1.30 | 0.28 |
| Cross-sectional area St mm² | 157.5 | 147 | 195 | 42 |
| Composite material | | | | |
| Type of composite material | Comparative composite material 1 | Comparative composite material 2 | Comparative composite material 3 | Comparative composite material 4 |
| Thickness mm | 1.04 | 0.99 | 1.17 | 0.26 |
| Width mm | 150 | 150 | 150 | 150 |
| Cross-sectional area mm² | 156 | 148.5 | 176 | 39 |
| Sf mm² | 78 | 77.5 or less | 78 | 19 |
| Sr mm² | 78 | 77.5 or less | 78 | 19 |
| Sf + Sr | 155 | 155.1 or less | 155 | 39 |
| St/(Sf + Sr) | 1.02 | 0.95 or less | 1.26 | 1.08 |
| n1/N | 0.12 | 0.008 | 0.01 | 0.036 |
| p | 0.03 | ND | 0.009 | ND |
| 1 − dc/(dr × (Vr/100) + df × (Vf/100)) | 0.05 | <0.001 | 0.15 | 0.028 |
| Vf (%) | 50 | 50 or more | 50 | 50 |
| Lowered temperature ΔT° C. (Stability evaluation in molten state) | 32 | 52 | 23 | 90 |
| Shaped body | | | | |
| Bending strength (MPa) | 1490 | 1534 | 1491 | Not moldable |

TABLE 3-continued

|  | Comparative Example 1 | Comparative Example 2 | Comparative Example 3 | Comparative Example 4 |
|---|---|---|---|---|
| Bending modulus (GPa) | 105 | 113 | 106 | Not moldable |
| 1 − dm/(dr × (Vr/100) + df × (Vf/100)) | >0.001 | <0.001 | 0.05 | Not moldable |
| Number of defective fibers | 2 | 1 | 2 | Not moldable |
| Appearance determination | Good | Unsatisfactory | Unsatisfactory | Poor |

TABLE 4

|  | Reference Example 1 | Reference Example 2 |
|---|---|---|
| Type of fiber | Glass fiber | Glass fiber |
| Density of glass fibers g/cm³ | 2.6 | 2.6 |
| Thermoplasti resin | Polypropylene | Polypropylene |
| Density of polypropylene g/cm³ | 0.855 | 0.855 |
| Type of composite material | Reference material 1 | Reference material 2 |
| 1 − dc/(dr × (Vr/100) + df × (Vf/100)) | 0.008 | 0.001 or less |
| Vf (%) | 40 | 40 |
| Lowered temperature ΔT° C. (Stability evaluation in molten state) | 10 | 10 |

※ df was obtained by substituting the density of carbon fibers by density of glass fibers.

TABLE 5

|  | Reference Example 3 | Reference Example 4 | Reference Example 5 |
|---|---|---|---|
| Type of composite material | Composite material 1 | Comparative composite material 1 | Comparative composite material 3 |
| Press method | Hot pressing | Hot pressing | Hot pressing |
| Shaped body |  |  |  |
| Tensile strength (MPa) | 1900 | 1810 | 1800 |
| Bending strength (MPa) | 1705 | 1630 | 1610 |
| Bending modulus (GPa) | 111 | 105 | 100 |
| 1 − dm/(dr × (Vr/100) + df × (Vf/100)) | <0.001 | <0.001 | <0.001 |
| Surface appearance | Excellent | Excellent | Excellent |

INDUSTRIAL APPLICABILITY

The composite material of the present invention is capable of proving a shaped product having good surface appearance and excellent mechanical strength, and is very useful in various industrials of interior and exterior materials for transportation equipment such as automobiles, ships, airplanes, electric and electronic components, and office appliances and components.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and there equivalents.

What is claimed is:

1. A method of producing a shaped product comprising: cold-pressing a composite material, wherein the cold-pressing comprises:
   putting the composite material into a mold; and
   closing the mold to produce the shaped product,
   wherein the composite material consists of:
   carbon fibers that are unidirectional continuous fibers optionally covered with a sizing agent; and
   a thermoplastic resin,
   wherein the composite material before the cold-pressing has a thickness of 0.3 mm or more,
   when the composite material is observed from a direction perpendicular to a continuous fiber direction, a cross section of the carbon fibers included in the composite material satisfies Expression (1) and (2):

$$n1/N \leq 0.1 \qquad \text{Expression (1)},$$

and $$p < 0.01 \qquad \text{Expression (2)},$$

wherein N represents the number of carbon fibers included in the composite material,
   n1 represents the number of carbon fibers in which less than 50% of the surface is covered with at least one of the thermoplastic resin and the sizing agent,
   p represents a ratio of the number of carbon fibers which are not substantially covered with any of the thermoplastic resin and the sizing agent,
   number of voids in the shaped product is smaller than number of voids in the composite material,
   the composite material before the cold-pressing satisfies Expression (3):

$$0.001 \leq (1 - dc/(dr*(Vr/100) + df*(Vf/100))) \leq 0.1 \qquad \text{Expression (3), and}$$

a density dm of the shaped product satisfies Expression (4):

$$0 \leq (1 - dm/(dr*(Vr/100) + df*(Vf/100))) \leq 0.08 \qquad \text{Expression (4)},$$

wherein Vr represents a volume ratio (%) of thermoplastic resin included in the composite material,
   Vf represents a volume ratio (%) of carbon fibers included in the composite material,
   dr represents a density of thermoplastic resin,
   df represents a density of carbon fibers, and
   dc represents a density of the composite material.

2. The method according to claim 1,
   wherein a volume ratio (Vf) of the carbon fibers included in the composite material is 10 Vol % or more and 70 Vol % or less.

3. The method according to claim 1,
   wherein the thickness of the composite material before the cold-pressing is 0.4 mm or more and 10.0 mm or less.

4. The method according to claim 1,
wherein a width of the composite material is 20 mm or more and 2,000 mm or less.

5. The method according to claim 1,
wherein the composite material has a single layer structure.

6. The method according to claim 1,
wherein the mold is heated to a temperature lower than a melting point of a crystalline resin in a case in which the thermoplastic resin is the crystalline resin, or to a temperature lower than a glass transition temperature of a non-crystalline resin in a case in which the thermoplastic resin is the non-crystalline resin.

7. The method according to claim 1, further comprising
removing bubbles in the thermoplastic resin of the composite material such that the composite material before the cold-pressing satisfies the Expression (3).

8. The method according to claim 7,
wherein the removing is performed by inserting the composite material before cold-pressing into a hollow jig having a hollow portion.

9. The method according to claim 1,
wherein a volume ratio (Vf) of the carbon fibers included in the composite material is 20 Vol % or more and 60 Vol % or less.

10. The method according to claim 1,
wherein a volume ratio (Vf) of the carbon fibers included in the composite material is 30 Vol % or more and 60 Vol % or less.

11. The method according to claim 1,
wherein a volume ratio (Vf) of the carbon fibers included in the composite material is 35 Vol % or more and 55 Vol % or less.

12. The method according to claim 1,
wherein the composite material before the cold-pressing satisfies the following Expression:

$$0.005 \leq (1 - dc/(dr*(Vr/100) + df*(Vf/100))) \leq 0.1,$$

wherein Vr represents a volume ratio (%) of thermoplastic resin included in the composite material,
Vf represents a volume ratio (%) of carbon fibers included in the composite material,
dr represents a density of thermoplastic resin,
df represents a density of carbon fibers, and
dc represents a density of the composite material.

13. A method of producing a shaped product comprising:
heating a precursor of a composite material consisting of carbon fibers which are unidirectional continuous fibers optionally covered with a sizing agent and a thermoplastic resin;
adjusting a cross-sectional area of the precursor with a jig such that a cross section of the carbon fibers included in a cross-sectional area of the composite material satisfies Expression (1) and (2):

$$n1/N \leq 0.1 \qquad \text{Expression (1),}$$

$$p < 0.01 \qquad \text{Expression (2),}$$

wherein N represents the number of carbon fibers included in the composite material,
n1 represents the number of carbon fibers in which less than 50% of the surface is covered with at least one of the thermoplastic resin and the sizing agent,
p represents a ratio of the number of carbon fibers which are not substantially covered with any of the thermoplastic resin and the sizing agent, and
such that number of voids in the shaped product is smaller than number of voids in the composite material,
the composite material satisfies Expression (3):

$$0.001 \leq (1 - dc/(dr*(Vr/100) + df*(Vf/100))) \leq 0.1 \qquad \text{Expression (3), and}$$

a density dm of the shaped product satisfies Expression (4):

$$0 \leq (1 - dm/(dr*(Vr/100) + df*(Vf/100))) \leq 0.08 \qquad \text{Expression (4),}$$

wherein
Vr represents a volume ratio (%) of thermoplastic resin included in the composite material,
Vf represents a volume ratio (%) of carbon fibers included in the composite material,
dr represents a density of thermoplastic resin,
df represents a density of carbon fibers, and
dc represents a density of the composite material;
cooling the composite material precursor to produce a composite material; and
cold-pressing the composite material,
wherein the cold-pressing comprises:
putting the composite material into a mold; and
closing the mold.

14. The method according to claim 13,
wherein the jig is a hollow jig, and
a minimum cross-sectional area St of a hollow portion of the hollow jig satisfies Expression (5):

$$(Sf + Sr) < St < (Sf + Sr) * 1.3 \qquad \text{Expression (5)}$$

wherein Sf represents an area of carbon fibers included in a cross section of the composite material, the cross section being perpendicular to the continuous fiber direction, and
Sr represents an area of thermoplastic resin included in the cross section.

15. The method according to claim 14,
wherein the jig has a hollow, and
the method further comprises adjusting a cross section area of the hollow with respect to the cross-sectional area of the precursor.

16. The method according to claim 13,
wherein the jig has a hollow, and
the method further comprises adjusting a cross section area of the hollow with respect to the cross-sectional area of the precursor.

17. A method of producing a shaped product comprising:
cold-pressing a composite material, wherein the cold-pressing comprises:
putting the composite material into a mold; and
closing the mold to produce the shaped product,
wherein the composite material consists of:
carbon fibers that are unidirectional continuous fibers optionally covered with a sizing agent;
a thermoplastic resin; and
a non-fibrous additive selected from the group consisting of fillers, a flame retardant, an anti-UV agent, a stabilizing agent, a releasing agent, a pigment, a softening agent, a plasticizer, and a surfactant,
wherein the composite material before the cold-pressing has a thickness of 0.3 mm or more,
when the composite material is observed from a direction perpendicular to a continuous fiber direction, a cross section of the carbon fibers included in the composite material satisfies Expression (1) and (2):

$n1/N \leq 0.1$      Expression (1), and $p < 0.01$      Expression (2), wherein N represents the number of carbon fibers included in the composite material, n1 represents the number of carbon fibers in which less than 50% of the surface is covered with at least one of the thermoplastic resin and the sizing agent, p represents a ratio of the number of carbon fibers which are not substantially covered with any of the thermoplastic resin and the sizing agent, number of voids in the shaped product is smaller than number of voids in the composite material, the composite material before the cold-pressing satisfies Expression (3):

$0.001 \leq (1 - dc/(dr*(Vr/100) + df*(Vf/100))) \leq 0.1$      Expression (3), and a density dm of the shaped product satisfies Expression (4):

$0 \leq (1 - dm/(dr*(Vr/100) + df*(Vf/100))) \leq 0.08$      Expression (4), wherein Vr represents a volume ratio (%) of thermoplastic resin included in the composite material, Vf represents a volume ratio (%) of carbon fibers included in the composite material, dr represents a density of thermoplastic resin, df represents a density of carbon fibers, and dc represents a density of the composite material.

\* \* \* \* \*